United States Patent
Qu

(10) Patent No.: US 10,198,119 B2
(45) Date of Patent: Feb. 5, 2019

(54) ARRAY SUBSTRATE HAVING A GATE INSULATION LAYER, IN-CELL TOUCH PANEL AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventor: Lianjie Qu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 89 days.

(21) Appl. No.: 14/906,191

(22) PCT Filed: Aug. 21, 2015

(86) PCT No.: PCT/CN2015/087799
§ 371 (c)(1),
(2) Date: Jan. 19, 2016

(87) PCT Pub. No.: WO2016/123964
PCT Pub. Date: Aug. 11, 2016

(65) Prior Publication Data
US 2016/0370945 A1 Dec. 22, 2016

(30) Foreign Application Priority Data
Feb. 6, 2015 (CN) .......................... 2015 1 0065014

(51) Int. Cl.
*G06F 3/044* (2006.01)
*G06F 3/041* (2006.01)

(52) U.S. Cl.
CPC ............ *G06F 3/0418* (2013.01); *G06F 3/044* (2013.01); *G06F 3/0412* (2013.01); *G06F 2203/04103* (2013.01); *G06F 2203/04111* (2013.01)

(58) Field of Classification Search
None
See application file for complete search history.

(56) References Cited

U.S. PATENT DOCUMENTS

2011/0080376 A1 4/2011 Kuo et al.
2014/0168539 A1* 6/2014 Kim ........................ G06F 3/041
349/12
(Continued)

FOREIGN PATENT DOCUMENTS

| CN | 101236976 A | 8/2008 |
| CN | 102854678 A | 1/2013 |

(Continued)

OTHER PUBLICATIONS

Written Opinion of the International Searching Authority and International Search Report for International Application No. PCT/CN215/087799, dated Nov. 18, 2015. Translation provided by Dragon Intellectual Property Law Firm.

*Primary Examiner* — Amr A Awad
*Assistant Examiner* — Donna V Lui
(74) *Attorney, Agent, or Firm* — Harness, Dickey & Pierce, P.L.C.

(57) ABSTRACT

The present disclosure provides an array substrate, an in-cell touch panel and a display device. The array substrate includes a display region and a non-display region. Gate lines, data lines, thin-film transistors and pixel electrodes are arranged at the display region, and each thin-film transistor includes a gate electrode, a gate insulation layer, an active layer, a source electrode and a drain electrode. First signal lines and second signal lines are arranged at the non-display
(Continued)

region, and the first signal lines are located at a layer different from the second signal lines and intersect with the second signal lines. The first signal lines are arranged at a layer and made of a material identical to the gate lines. The gate insulation layer and at least one thickening layer are provided between the first signal lines and the second signal lines at overlapping regions of the first signal lines and the second signal lines.

14 Claims, 5 Drawing Sheets

(56) References Cited

U.S. PATENT DOCUMENTS

| | | | | |
|---|---|---|---|---|
| 2015/0169113 A1* | 6/2015 | Ito | ............................ | G06F 3/041 |
| | | | | 345/174 |
| 2015/0293629 A1* | 10/2015 | Ryu | ........................ | G06F 3/044 |
| | | | | 345/174 |
| 2016/0103529 A1* | 4/2016 | Kim | ........................ | G06F 3/044 |
| | | | | 216/13 |
| 2016/0195956 A1 | 7/2016 | Zhao et al. | | |
| 2016/0370945 A1 | 12/2016 | Qu | | |
| 2017/0147116 A1* | 5/2017 | Lee | ........................ | H01L 27/323 |
| 2017/0153766 A1* | 6/2017 | Kimura | ................ | G06F 3/0418 |

FOREIGN PATENT DOCUMENTS

| | | | |
|---|---|---|---|
| CN | 104155818 A | | 11/2014 |
| CN | 104281352 A | | 1/2015 |
| CN | 104571720 A | | 4/2015 |

\* cited by examiner

ARRAY SUBSTRATE HAVING A GATE INSULATION LAYER, IN-CELL TOUCH PANEL AND DISPLAY DEVICE

CROSS-REFERENCE TO RELATED APPLICATION

This application is the U.S. national phase of PCT Application No. PCT/CN2015/087799 filed on Aug. 21, 2015, which claims a priority to the Chinese Patent Application No. 201510065014.6 filed on Feb. 6, 2015, the disclosure of which is incorporated in its entirety by reference herein.

TECHNICAL FIELD

The present disclosure relates to the field of display technology, in particular to an array substrate, an in-cell touch panel and a display device.

BACKGROUND

Referring to FIG. 1 which is a schematic view showing an array substrate of an existing in-cell touch panel, the array substrate includes a display region 10 and a non-display region 20 surrounding the display region 10. A gate on array (GOA) unit 30 and touch driving electrode (TX) lines 102 are provided at the non-display region. The GOA unit 30 is connected to gate lines (not shown) at the display region via lateral gate driving signal lines 104, and the touch driving signal lines 102 are connected to touch driving electrodes (not shown) at the display region. Because the touch driving signal lines 102 and the gate driving signal lines 104 are arranged at the non-display region, there inevitably exist overlapping regions between the touch driving signal lines 102 and the gate driving signal lines 104 and between the lateral touch driving signal lines 102 and the vertical touch driving signal lines 102. The overlapping regions are just regions surrounded by dotted lines in FIG. 1. Overlapping regions surrounded by the dotted lines 201 refer to those between the touch driving signal lines 102 and the gate driving signal lines 104, and overlapping regions surrounded by the dotted lines 202 refer to those between the horizontal touch driving signal lines 102 and the vertical touch driving signal lines 102.

Referring to FIG. 2, which is a sectional view of an overlapping region between the touch driving signal line and the gate driving signal line in FIG. 1, 101 represents a base substrate, 102 represents the touch driving signal line, 103 represents a gate insulation layer (GI), 104 represents the gate driving signal line, and 105 represents a passivation layer. Generally, the gate insulation layer has a thickness of only thousands of angstroms, so a large capacitance and a strong signal coupling effect are generated between the touch driving signal line 102 and the gate driving signal line 104 overlapping each other. When a gate driving signal is transmitted via the gate driving signal line 104, the gate driving signal may be partially coupled to the touch driving signal line 102 in the overlapping region, resulting in a very large noise to a touch driving signal. As a result, it is impossible to improve a signal-to-noise ratio and prevent the occurrence of flickering.

SUMMARY

An object of the present disclosure is to provide an array substrate, an in-cell touch panel and a display device, so as to reduce a noise in the signal transmitted via the signal line when a strong signal coupling effect exists between the signal lines overlapping each other at the non-display region of the array substrate.

In one aspect, the present disclosure provides in some embodiments an array substrate, including a display region and a non-display region. Gate lines, data lines, thin-film transistors and pixel electrodes are arranged at the display region. Each thin-film transistor includes a gate electrode, a gate insulation layer, an active layer, a source electrode and a drain electrode. First signal lines and second signal lines are arranged at the non-display region, and the first signal lines are located at a layer different from the second signal lines and intersect with the second signal lines. The first signal lines are arranged at a layer and made of a material identical to the gate lines. The gate insulation layer and at least one thickening layer are provided between the first signal lines and the second signal lines at overlapping regions of the first signal lines and the second signal lines.

Alternatively, touch driving electrodes are further provided at the display region, and the first signal lines are touch driving signal lines connected to the touch driving electrodes and configured to transmit a touch driving signal to the touch driving electrodes.

Alternatively, the second signal lines include gate driving signal lines connected to the gate lines and configured to transmit a gate driving signal to the gate lines.

Alternatively, the second signal lines include touch driving signal lines connected to the touch driving electrodes.

Alternatively, a common electrode is further provided at the display region, and an intermediate insulation layer is provided between a layer where the common electrode is located and a layer where the data lines are located. Each second signal line includes separated source/drain metal segments and a common electrode bridging line configured to connect the separated source/drain metal segments, the source/drain metal segments are arranged at a layer and made of a material identical to the data lines, the common electrode bridging line is arranged at a layer and made of a material identical to the common electrode, and the common electrode bridging line is located at the overlapping region of the first signal line and the second signal line. The gate insulation layer and the intermediate insulation layer are provided between the common electrode bridging line and the first signal line at the overlapping region, and the intermediate insulation layer functions as the thickening layer.

Alternatively, a common electrode is further provided at the display region, an intermediate insulation layer is provided between a layer where the common electrode is located and a layer where the data lines are located. The second signal lines are arranged at a layer and made of a material identical to the common electrode, the gate insulation layer and the intermediate insulation layer are provided between the first signal lines and the second signal lines at the overlapping regions, and the intermediate insulation layer functions as the thickening layer.

Alternatively, the intermediate insulation layer is made of resin and has a thickness ranging from 1 μm to 2 μm.

Alternatively, the second signal lines are arranged at a layer and made of a material identical to the data lines, at least the gate insulation layer and a semiconductor thickening layer are provided between the first signal lines and the second signal lines at the overlapping regions, the semiconductor thickening layer is arranged at a layer and made of a material identical to the active layer of the TFT, and the semiconductor thickening layer functions as the thickening layer.

Alternatively, each second signal line includes separated source/drain metal segments and a pixel electrode bridging line configured to connect the separated source/drain metal segments, the source/drain metal segments are arranged at a layer and made of a material identical to the data lines, and the pixel electrode bridging line is arranged at a layer and made of a material identical to the pixel electrodes. The pixel electrode bridging line is located at the overlapping region of the first signal line and the second signal line, at least the gate insulation layer and a passivation layer are provided between the pixel electrode bridging line and the first signal line at the overlapping region, and the passivation layer functions as the thickening layer.

Alternatively, the second signal lines are arranged at a layer and made of a material identical to the pixel electrodes, at least the gate insulation layer and a passivation layer are provided between the first signal lines and the second signal lines at the overlapping regions, and the passivation layer functions as the thickening layer.

In another aspect, the present disclosure provides in some embodiments an in-cell touch panel, including the above-mentioned array substrate.

In yet another aspect, the present disclosure provides in some embodiments a display device, including the above-mentioned in-cell touch panel.

According to the embodiments of the present disclosure, at least one thickening layer is arranged at the overlapping region of the two signal lines at the non-display region of the array substrate, so as to change a distance between the two signal lines at the overlapping region and reduce the capacitance between the two lines, thereby to reduce the signal coupling effect, improve the signal-to-noise ratio, and prevent the occurrence of flickering.

DETAILED DESCRIPTION OF THE EMBODIMENTS

Figure 1:
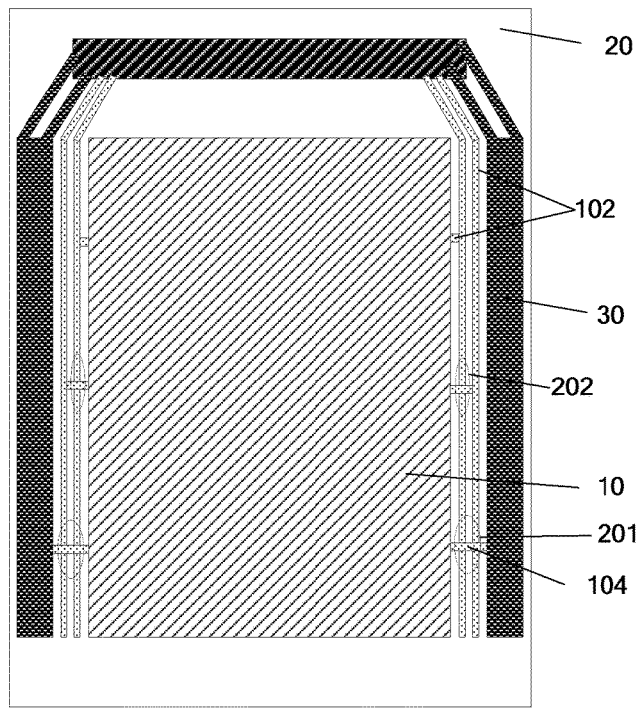
FIG. 1 is a schematic view showing an array substrate of an existing in-cell touch panel.
Figure 2:
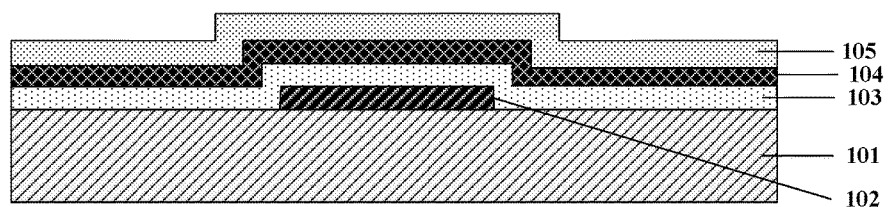
FIG. 2 is a sectional view of an overlapping region of a touch driving signal line and a gate driving signal line in FIG. 1.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

According to the formula $C=\varepsilon s/d$ for calculating capacitance, a capacitance between two lines depends on an overlapping area s of the two lines and a distance d therebetween. When the overlapping area s is constant, the capacitance between the two lines may be changed by changing the distance d therebetween.

In view of the above, in order to reduce the capacitance at an overlapping region of two signal lines located at a non-display region of an array substrate, at least one thickening layer is added at the overlapping region of the two signal lines in the embodiments of the present disclosure, so as to change a distance between the two signal lines at the overlapping region, thereby to reduce the capacitance therebetween and the signal coupling effect, improve the signal-to-noise ratio, and prevent the occurrence of flickering.

The present disclosure will be described hereinafter in conjunction with the drawings and embodiments. The following embodiments are for illustrative purposes only, but shall not be used to limit the scope of the present disclosure.

The present disclosure provides in some embodiments an array substrate, which includes a display region and a non-display region. Gate lines, data lines, thin-film transistors and pixel electrodes are arranged at the display region. Each thin-film transistor includes a gate electrode, a gate insulation layer, an active layer, a source electrode and a drain electrode. First signal lines and second signal lines are arranged at the non-display region, and the first signal lines are located at a layer different from the second signal lines and intersect with the second signal lines. The first signal lines are arranged at a layer and made of a material identical to the gate lines. The gate insulation layer and at least one thickening layer are provided between the first signal lines and the second signal lines at overlapping regions of the first signal lines and the second signal lines.

Since the first signal lines and the second signal lines are located at the non-display region, there inevitably exist overlapping regions between the first signal lines and the second signal lines. When a distance between one first signal line and one second signal line at the overlapping region is relatively small, a large capacitance and a strong signal coupling effect may be generated therebetween. As a result, large noises may exist in signals transmitted via the first signal and the second signal.

To solve the above problem, at least one thickening layer is added between the first signal line and the second signal line in the embodiments of the present disclosure, so as to increase the distance between the first signal line and the second signal line at the overlapping region, thereby to reduce the capacitance between the first signal line and the second signal line as well as the signal coupling effect, improve the signal-to-noise ratio, and prevent the occurrence of flickering.

In the embodiments of the present disclosure, the first signal lines and the second signal lines are signal lines for transmitting signals to the display region, for example, to signal lines (gate lines or data lines) or electrodes (touch driving electrodes or a common electrode) located at the display region.

In an alternative embodiment of the present disclosure, the first signal lines are touch driving signal lines connected to touch driving electrodes at the display region and configured to transmit a touch driving signal to the touch driving electrodes. The second signal lines are gate driving signal lines connected to the gate lines at the display region and configured to transmit a gate driving signal to the gate lines.

Figure 3:
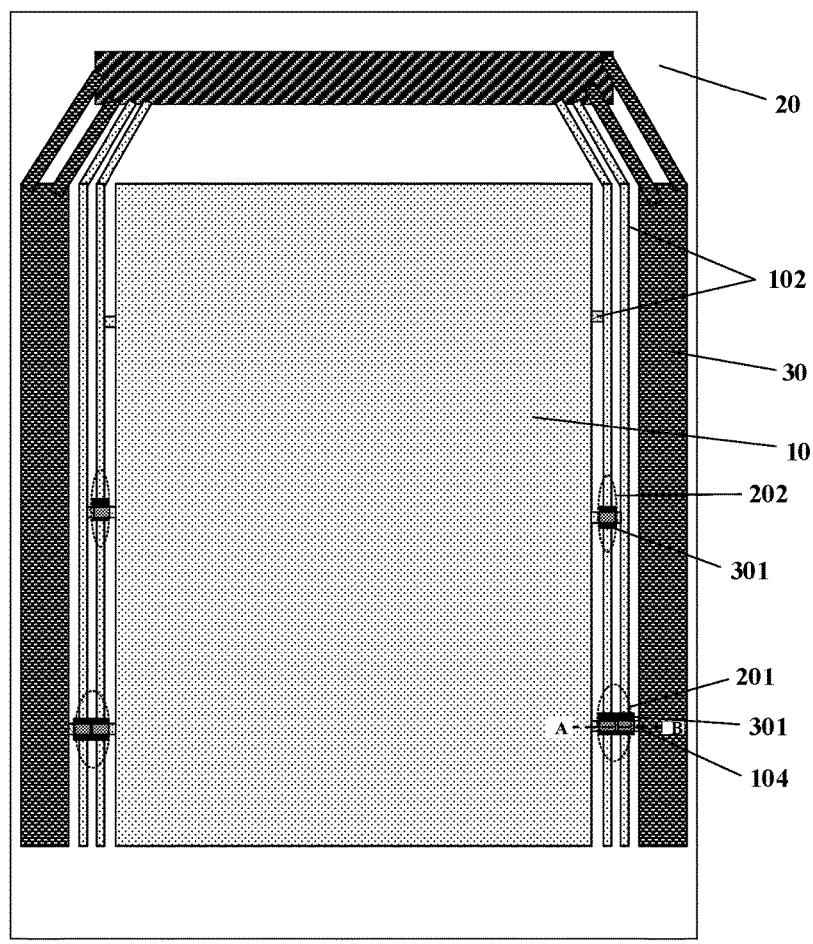
FIG. 3 is a front view of an array substrate according to one embodiment of the present disclosure.

Referring to FIG. 3 which is a front view of an array substrate according to one embodiment of the present disclosure, the array substrate includes a display region 10 and a non-display region 20 surrounding the display region 10. A GOA unit 30 and touch driving signal lines 102 are arranged at the non-display region 20, the GOA unit is connected to gate lines (not shown) at the display region 10 via lateral gate driving signal lines 104, and the touch driving signal lines 102 are connected to touch driving electrodes (not shown) at the display region 10.

Because the touch driving signal lines 102 and the gate driving signal lines 104 are arranged at the non-display region, there inevitably exist overlapping regions therebetween, and these overlapping regions may refer to the regions surrounded by dotted lines 201 in FIG. 3. When a distance between one touch driving signal line 102 and one gate driving signal line 104 at the overlapping region is relatively small, a large capacitance and a strong signal coupling effect may be generated therebetween. When a gate driving signal is transmitted via the gate driving signal line 104, the gate driving signal may be partially coupled to the touch driving signal line 102, resulting in a very large noise to a touch driving signal. As a result, it is impossible to improve the signal-to-noise ratio and prevent the occurrence of flickering.

In view of the above, in the embodiments of the present disclosure, at least one thickening layer 301 is added between the touch driving signal line 102 and the gate driving signal line 104 at the overlapping region, so as to increase the distance therebetween, thereby to reduce the capacitance therebetween as well as the signal coupling effect, improve the signal-to-noise ratio and prevent the occurrence of flickering.

In another alternative embodiment of the present disclosure, the first signal line and the second signal line are both touch driving signal lines. One of the first signal line and the second signal line is a lateral touch driving signal line, and the other is a vertical touch driving signal line.

Referring to FIG. 3 again, because the lateral touch driving signal lines 102 and the vertical touch driving signal lines 102 are arranged at the non-display region, there inevitably exist overlapping regions therebetween, and these overlapping regions may refer to the regions surrounded by dotted lines 202 in FIG. 3. When a distance between two touch driving signal lines 102 at the overlapping region is relatively small, a large capacitance and a strong signal coupling effect may be generated between the two touch driving signal lines 102.

In view of the above, in the embodiments of the present disclosure, at least one thickening layer 301 is added between the two touch driving signal lines 102 at the overlapping region, so as to reduce the distance therebetween, thereby to reduce the capacitance therebetween as well as the signal coupling effect, improve the signal-to-noise ratio and prevent the occurrence of flickering.

An arrangement mode of the thickening layer will be described hereinafter.

Figure 4:
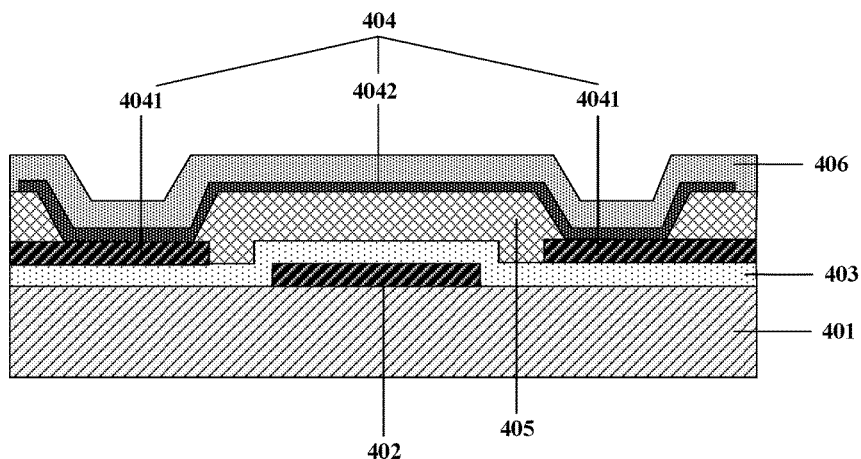
FIG. 4 is a sectional view of the array substrate including a thickening layer according to the first embodiment of the present disclosure.

Referring to FIG. 4 which is a sectional view of an array substrate including a thickening layer according to the first embodiment of the present disclosure, the array substrate includes a base substrate 401, a first signal line 402, a gate insulation layer 403, a second signal line 404, an intermediate insulation layer 405 and a passivation layer 406.

The first signal line 402 is arranged at a layer and made of a material identical to the gate line. In the embodiment of the present disclosure, the first signal line 402 may be a touch driving signal line.

The intermediate insulation layer 405 is an insulation layer between a layer where a common electrode of the array substrate is located and a layer where a data line of the array substrate is located.

The second signal line 404 may be a gate driving signal line or a touch driving signal line. The second signal line 404 includes separated source/drain metal segments 4041 and a common electrode bridging line 4042 configured to connect the separated source/drain metal segments 4041. The source/drain metal segments 4041 is arranged at a layer and made of a material identical to the data line. The common electrode bridging line 4042 is arranged at a layer and made of a material identical to the common electrode, and connected to the source/drain metal segments 4041 through via-holes. The common electrode bridging line 4042 is located at an overlapping region of the first signal line 402 and the second signal line 404. The gate insulation layer 403 and the intermediate insulation layer 405 are provided between the common electrode bridging line 4042 and the first signal line 402 at the overlapping region, and the intermediate insulation layer 405 functions as a thickening layer.

Figure 5:
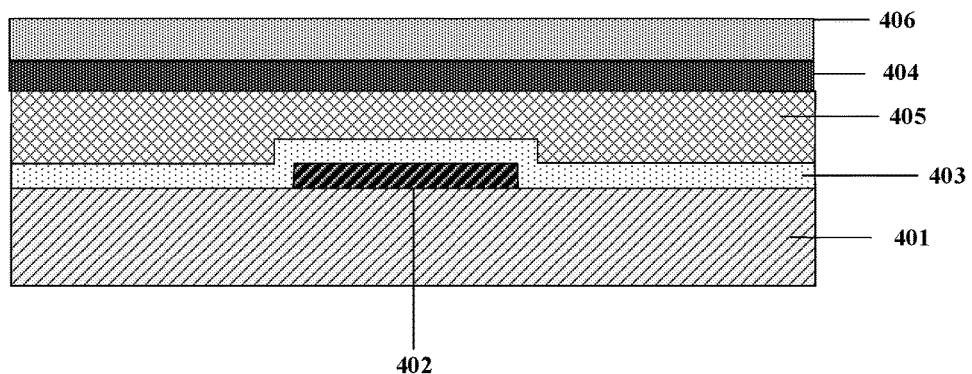
FIG. 5 is another sectional view of an the substrate including a thickening layer according to the second embodiment of the present disclosure.

Referring to FIG. 5 which is a sectional view of the array substrate including a thickening layer according to the second embodiment of the present disclosure, the array substrate includes a base substrate 401, a first signal line 402, a gate insulation layer 403, a second signal line 404, an intermediate insulation layer 405 and a passivation layer 406.

The first signal line 402 is as arranged at a layer and made of a material identical to the gate line. In the embodiment of the present disclosure, the first signal line 402 may be a touch driving signal line.

The intermediate insulation layer 405 is an insulation layer between a layer where a common electrode of the array substrate is located and a layer where a data line of the array substrate is located.

The second signal line 404 may be a gate driving signal line or a touch driving signal line. The second signal line 404 is arranged at a layer and made of a material identical to the common electrode, that is, the second signal line 404 is made of the material of the common electrode, e.g., ITO. At this time, between the first signal line 402 and the second signal line 404 at the overlapping region, the gate insulation layer 403 and the intermediate insulation layer 405 are provided. The intermediate insulation layer 405 functions as a thickening layer.

In the above two embodiments, the intermediate insulation layer 405 may be made of a material such as resin and may have a thickness of about 1-2 μm. As compared with the related art where only the gate insulation layer is provided between the first signal line 402 and the second signal line 404 at the overlapping region, in the embodiments of the present disclosure, the capacitance between the first signal line 402 and the second signal line 404 at the overlapping region may be reduced by 70% to 90%.

In the above two embodiments, the intermediate insulation layer 405 between the first signal line 402 and the second signal line 404 at the overlapping region functions as the thickening layer to increase the distance therebetween. As a result, it is able to reduce the capacitance therebetween as well as the signal coupling effect, improve the signal-to-noise ratio, and prevent the occurrence of flickering.

Figure 6:
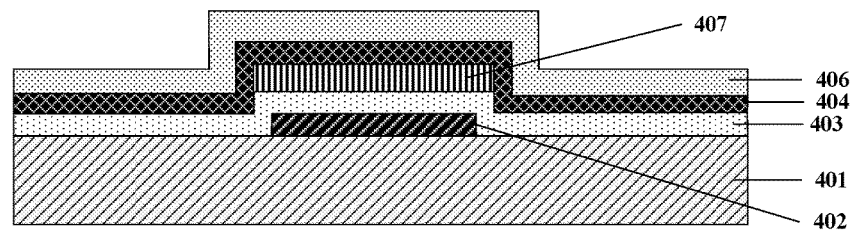
FIG. 6 is yet another sectional view of the array substrate including a thickening layer according to the third embodiment of the present disclosure.

Referring to FIG. 6 which is a sectional view of the array substrate including a thickening layer according to the third embodiment of the present disclosure, the array substrate includes a base substrate 401, a first signal line 402, a gate insulation layer 403, a semiconductor thickening layer 407, a second signal line 404 and a passivation layer 406.

The first signal line 402 is arranged at a layer and made of a material identical to the gate line. In the embodiment of the present disclosure, the first signal line 402 may be a touch driving signal line.

The semiconductor thickening layer 407 is arranged at a layer and made of a material identical to an active layer of a thin-film transistor on the array substrate.

The second signal line 404 may be a gate driving signal line or a touch driving signal line. The second signal line 404 is arranged at a layer and made of a material identical to a data line of the array substrate, that is, the second signal line 404 is made of a source/drain metal.

At least the gate insulation layer 403 and the semiconductor thickening layer 407 are provided between the first signal line 402 and the second signal line 404 at the overlapping region. The semiconductor thickening layer 407 functions as a thickening layer.

In the embodiment of the present disclosure, the entire second signal line 404 is made of a material identical to the data line, i.e., a source/drain metal. As a result, it is able to increase the distance between the first signal line 402 and the second signal line 404 at the overlapping region without decreasing a resistance of the second signal line 404.

Figure 7:
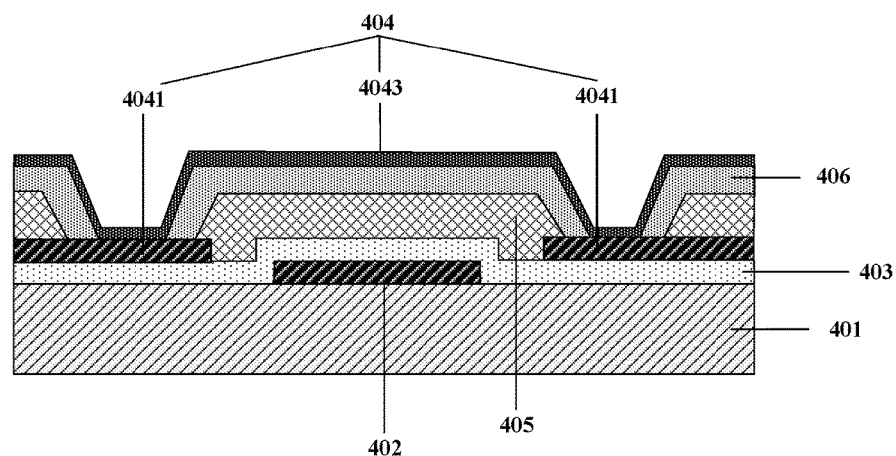
FIG. 7 is still yet another sectional view of the array substrate including a thickening layer according to the fourth embodiment of the present disclosure.

Referring to FIG. 7 which is a sectional view of the array substrate including a thickening layer according to the fourth embodiment of the present disclosure, the array substrate includes a base substrate 401, a first signal line 402, a gate insulation layer 403, a second signal line 404, an intermediate insulation layer 405 and a passivation layer 406.

The first signal line 402 is as arranged at a layer and made of a material identical to the gate line. In the embodiment of the present disclosure, the first signal line 402 may be a touch driving signal line.

The intermediate insulation layer 405 is an insulation layer between a layer where a common electrode is located and a layer where a data line is located.

The second signal line 404 may be a gate driving signal line or a touch driving signal line. The second signal line 404 includes separated source/drain metal segments 4041 and a pixel electrode bridging line 4043 configured to connect the separated source/drain metal segments. The source/drain metal segments 4041 are arranged at a layer and made of a material, i.e., a source/drain metal, identical to the data line. The pixel electrode bridging line 4043 is arranged at a layer and made of a material identical to a pixel electrode, and located at the overlapping region of the first signal line 402 and the second signal line 404. The gate insulation layer 403, the intermediate insulation layer 405 and the passivation layer 406 are provided between the pixel electrode bridging line 4043 and the first signal line 402 at the overlapping region, and the intermediate insulation layer 405 and the passivation layer 406 function together as a thickening layer.

Figure 8:
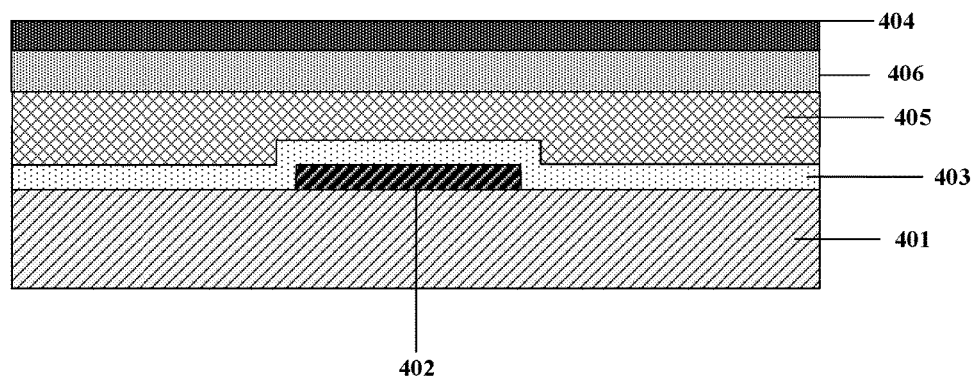
FIG. 8 is still yet another sectional view of the array substrate including a thickening layer according to the fifth embodiment of the present disclosure.

Referring to FIG. 8 which is a sectional view of the array substrate including a thickening layer according to the fifth embodiment of the present disclosure, the array substrate includes a base substrate 401, a first signal line 402, a gate insulation layer 403, a second signal line 404, an intermediate insulation layer 405 and a passivation layer 406.

The first signal line 402 is as arranged at a layer and made of a material identical to the gate line. In the embodiment of the present disclosure, the first signal line 402 may be a touch driving signal line.

The intermediate insulation layer 405 is an insulation layer between a layer where a common electrode is located and a layer where a data line is located.

The second signal line 404 is arranged at a layer and made of a material identical to a pixel electrode of the array substrate, that is, the entire second signal line 404 is made of a material of the pixel electrode, e.g., ITO. At this time, between the first signal line 402 and the second signal line 404 in an overlapping region, the gate insulation layer 403, the intermediate insulation layer 405 and the passivation layer 406 are provided. The intermediate insulation layer 405 and the passivation layer 406 function together as a thickening layer.

In the above two embodiments, since the thickening layer includes the intermediate insulation layer 405 and the passivation layer 406, it is able to provide a larger distance between the first signal line 402 and the second signal line 404 in the overlapping region, thereby to further reduce the capacitance therebetween.

In the array substrate including touch driving electrodes according to the abovementioned embodiments, usually the touch driving electrodes are multiplexed as common electrodes. That is, a common electrode layer is divided into multiple touch driving electrodes and multiple common electrodes, and the touch driving electrodes are spaced from the common electrodes. Within a touch stage, a touch driving signal is applied to the touch driving electrodes, and within a display stage, a common electrode signal is applied thereto and the touch driving electrode is multiplexed as the common electrode.

The present disclosure further provides in some embodiments an in-cell touch panel, including the above-mentioned array substrate.

The present disclosure further provides in some embodiments a display device, including the above-mentioned in-cell touch panel.

The above are merely the preferred embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. An array substrate for a touch display, comprising a display region and a non-display region, wherein
    gate lines, data lines, thin-film transistors and pixel electrodes are arranged at the display region;
    each thin-film transistor comprises a gate electrode, a gate insulation layer, an active layer, a source electrode and a drain electrode;
    first signal lines and second signal lines are arranged at the non-display region,
    wherein at the non-display region the first signal lines are located at a layer different from the second signal lines and intersect with the second signal lines;
    the first signal lines are arranged at a layer and made of a material identical to the gate lines; and
    the gate insulation layer and at least one thickening layer are provided between the first signal lines and the second signal lines at overlapping regions of the first signal lines and the second signal lines at the non-display region, wherein touch driving electrodes are further provided in the display region, and the first signal lines are touch driving signal lines connected to the touch driving electrodes and configured to transmit a touch driving signal to the touch driving electrodes; wherein the second signal lines comprise gate driving signal lines connected to the gate lines and configured to transmit a gate driving signal to the gate lines;

wherein a common electrode is further provided at the display region, and an intermediate insulation layer is provided between a layer where the common electrode is located and a layer where the data lines are located;

each second signal line comprises separated source/drain metal segments and a common electrode bridging line configured to connect the separated source/drain metal segments, the source/drain metal segments are arranged at a layer and made of a material identical to the data lines, the common electrode bridging line is arranged at a layer and made of a material identical to the common electrode, and the common electrode bridging line is provided at the overlapping region of the first signal line and the second signal line; and the gate insulation layer and the intermediate insulation layer are provided between the common electrode bridging line and the first signal line at the overlapping region, and the intermediate insulation layer functions as the thickening layer.

2. The array substrate according to claim 1, wherein the second signal lines include touch driving signal lines connected to the touch driving electrodes.

3. The array substrate according to claim 1, wherein the intermediate insulation layer is made of resin and has a thickness ranging from 1 μm to 2 μm.

4. An in-cell touch panel, comprising the array substrate according to claim 1.

5. A display device, comprising the in-cell touch panel according to claim 4.

6. An array substrate for a touch display, comprising a display region and a non-display region, wherein
gate lines, data lines, thin-film transistors, and pixel electrodes are arranged at the display region;
each thin-film transistor comprises a gate electrode, a gate insulation layer, an active layer, a source electrode, and a drain electrode;
first signal lines and second signal lines are arranged at the non-display region,
wherein at the non-display region the first signal lines are located at a layer different from the second signal lines and intersect with the second signal lines;
the first signal lines are arranged at a layer and made of a material identical to the gate lines; and
the gate insulation layer and at least one thickening layer are provided between the first signal lines and the second signal lines at overlapping regions of the first signal lines and the second signal lines at the non-display region, wherein touch driving electrodes are further provided in the display region, and the first signal lines are touch driving signal lines connected to the touch driving electrodes and configured to transmit a touch driving signal to the touch driving electrodes; wherein the second signal lines comprise gate driving signal lines connected to the gate lines and configured to transmit a gate driving signal to the gate lines;
wherein the second signal lines are arranged at a layer and made of a material identical to the data lines, at least the gate insulation layer and a semiconductor thickening layer are provided between the first signal lines and the second signal lines at the overlapping regions, the semiconductor thickening layer is arranged at a layer and made of a material identical to the active layer of the TFT, and the semiconductor thickening layer functions as the thickening layer.

7. The array substrate according to claim 6, wherein touch driving electrodes are further provided in the display region, and the first signal lines are touch driving signal lines connected to the touch driving electrodes and configured to transmit a touch driving signal to the touch driving electrodes.

8. The array substrate according to claim 7, wherein the second signal lines comprise gate driving signal lines connected to the gate lines and configured to transmit a gate driving signal to the gate lines.

9. The array substrate according to claim 7, wherein the second signal lines include touch driving signal lines connected to the touch driving electrodes.

10. An array substrate for a touch display, comprising a display region and a non-display region, wherein
gate lines, data lines, thin-film transistors, and pixel electrodes are arranged at the display region;
each thin-film transistor comprises a gate electrode, a gate insulation layer, an active layer, a source electrode, and a drain electrode;
first signal lines and second signal lines are arranged at the non-display region,
wherein at the non-display region the first signal lines are located at a layer different from the second signal lines and intersect with the second signal lines;
the first signal lines are arranged at a layer and made of a material identical to the gate lines; and
the gate insulation layer and at least one thickening layer are provided between the first signal lines and the second signal lines at overlapping regions of the first signal lines and the second signal lines at the non-display region, wherein touch driving electrodes are further provided in the display region, and the first signal lines are touch driving signal lines connected to the touch driving electrodes and configured to transmit a touch driving signal to the touch driving electrodes; wherein the second signal lines comprise gate driving signal lines connected to the gate lines and configured to transmit a gate driving signal to the gate lines;
wherein each second signal line comprises separated source/drain metal segments and a pixel electrode bridging line configured to connect the separated source/drain metal segments, the source/drain metal segments are arranged at a layer and made of a material identical to the data lines, and the pixel electrode bridging line is arranged at a layer and made of a material identical to the pixel electrodes; and
the pixel electrode bridging line is located at the overlapping region of the first signal line and the second signal line, at least the gate insulation layer and a passivation layer are provided between the pixel electrode bridging line and the first signal line at the overlapping region, and the passivation layer functions as the thickening layer.

11. The array substrate according to claim 10, wherein touch driving electrodes are further provided in the display region, and the first signal lines are touch driving signal lines connected to the touch driving electrodes and configured to transmit a touch driving signal to the touch driving electrodes.

12. The array substrate according to claim 11, wherein the second signal lines comprise gate driving signal lines connected to the gate lines and configured to transmit a gate driving signal to the gate lines.

13. The array substrate according to claim 11, wherein the second signal lines include touch driving signal lines connected to the touch driving electrodes.

14. The array substrate according to claim 10, wherein the gate insulation layer, the intermediate insulation layer, and the passivation layer are provided between the pixel electrode bridging line and the first signal line at the overlapping region, and the intermediate insulation layer and the passivation layer function together as the thickening layer.

* * * * *